United States Patent

[11] 3,626,197

| [72] | Inventors | Anthony Zanzarella<br>Ardsley, N.Y.;<br>Joseph B. Gag, Stamford, Conn. |
|---|---|---|
| [21] | Appl. No. | 59,578 |
| [22] | Filed | July 30, 1970 |
| [45] | Patented | Dec. 7, 1971 |
| [73] | Assignee | Textron Inc.,<br>Providence, R.I. |

[54] MOTOR GENERATOR WITH AUTOMATIC SPEED AND IDLING CONTROL
9 Claims, 5 Drawing Figs.

[52] U.S. Cl. ..................................... 290/40 C,
290/51
[51] Int. Cl. ........................................ H02p 9/04
[50] Field of Search............................ 290/38, 40,
17

[56] References Cited
UNITED STATES PATENTS
2,804,552  8/1957  McFarland .................. 290/40

FOREIGN PATENTS
678,161  1/1964  Canada ....................... 290/40

Primary Examiner—Bernard A. Gilheany
Assistant Examiner—W. E. Duncanson, Jr.
Attorneys—Robert E. Burns and Emmanuel J. Lobato ABSTRACT: An automatic control for an internal combustion engine driving an electric generator supplying a variable and intermittent load comprises a speed responsive governor controlling the throttle of the engine to maintain it at a constant operating speed as long as there is load on the generator regardless of the amount of load and an automatic override which reduces the engine speed to a selected idling speed when there is no load on the generator.

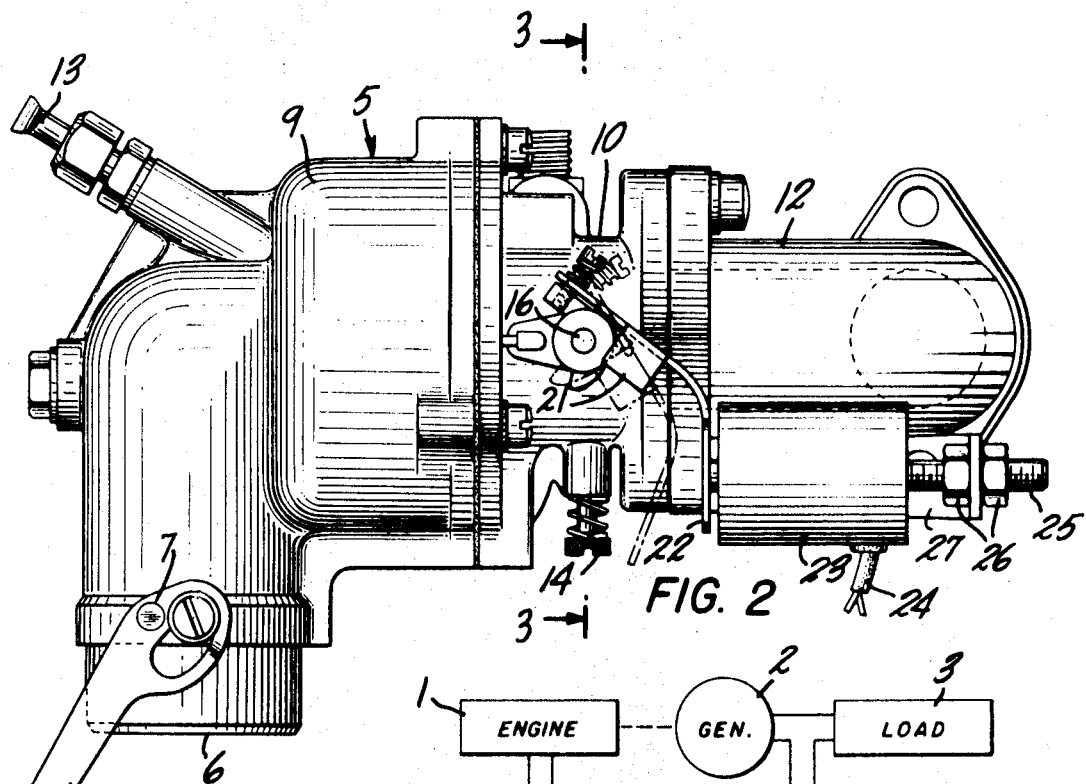
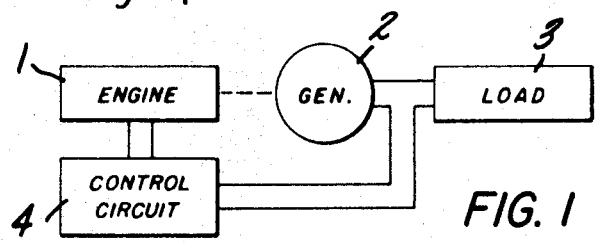
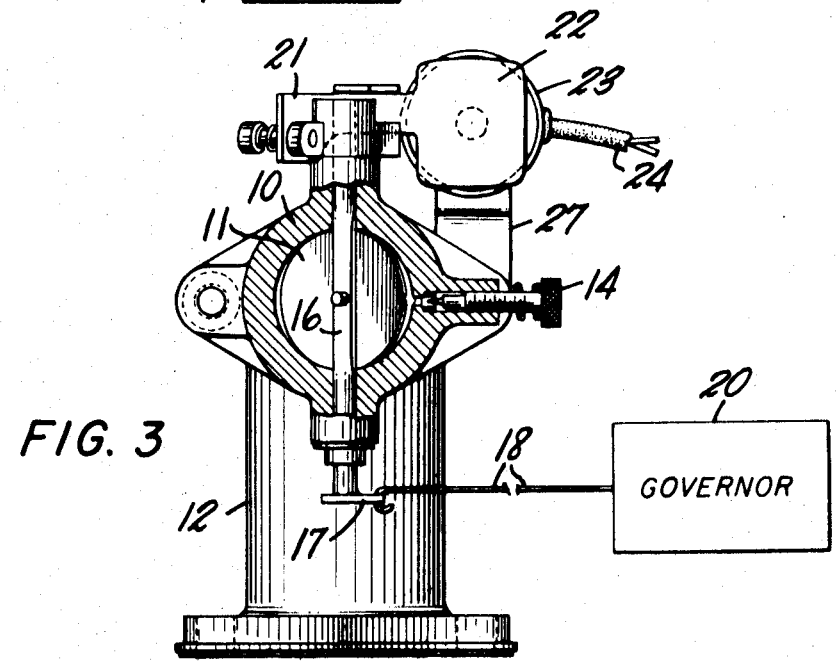

MOTOR GENERATOR WITH AUTOMATIC SPEED AND IDLING CONTROL

The invention relates to a motor generator set comprising an electric generator driven by an internal combustion engine and particularly to means for controlling the engine speed.

Motor generator sets are widely used to supply direct current, alternating current or both for a variety of loads as, for example, the lights and electric tools on a construction site. The load on the generator is usually variable, depending for example on what lights or tools are being used at any one time, and is also intermittent since there may be times when not lights and no appliances are being used. In order to provide a constant voltage and, in the case of an alternating current generator, a constant frequency, it is known to control the engine driving the generator by means of a speed responsive governor so as to maintain a relatively constant engine speed regardless of load. However, during periods when there is no load on the generator it is desirable to run the engine at a lower speed in order to save fuel, reduce the noise level and increase the life of the equipment.

It is an object of the present invention to provide an automatic control for an internal combustion engine driving an electric generator supplying a variable and intermittent load so as to maintain the engine speed at a relatively constant operating value as long as there is load on the generator regardless of the amount of load and automatically reduce the speed of the engine to a selected idling speed during periods when there is no load on the generator, the engine being automatically accelerated to operating speed as soon as any load is applied to the generator.

In accordance with the invention, engine speed is normally maintained at a selected operating value by a speed responsive governor, but means is provided for overriding the governor to operate the engine at a selected idling speed during periods when there is no load on the generator. When the generator is again subjected to load, the overriding means is deactivated so that control of the engine by the speed responsive governor is restored.

The nature and advantages of the invention will be more fully understood from the following description of preferred embodiments shown by way of example in the drawings in which:

FIG. 1 is a block diagram showing schematically an electric generator, an engine driving the generator, a load on the generator and a control circuit for the engine.

FIG. 2 is a plan of a carburetor for supplying fuel to the internal combustion engine of FIG. 1, the carburetor including a throttle valve controlled by a speed responsive governor and by an electromagnetic override device.

FIG. 3 is a cross section taken approximately on the line 3—3 in FIG. 2 and showing a speed responsive governor schematically.

Figure 4:
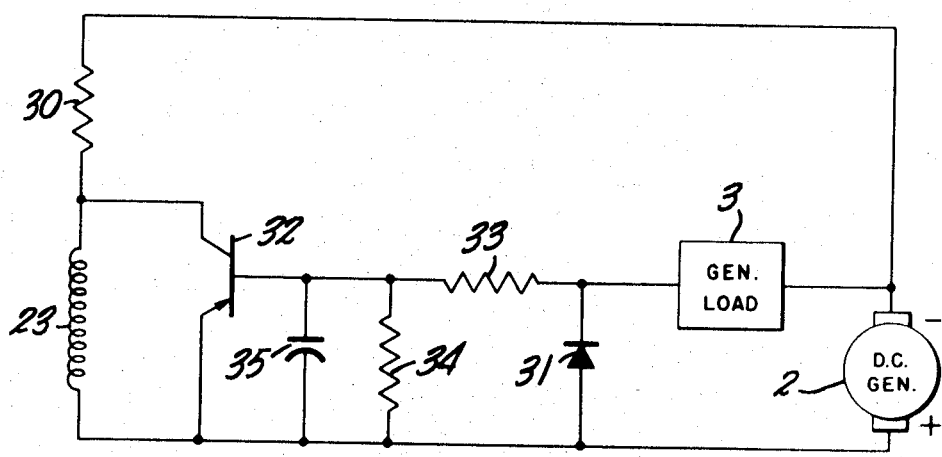
FIG. 4 is a circuit diagram showing the circuitry controlling the override device shown in FIGS. 2 and 3 when used with a direct current generator.

In FIG. 1 there is shown schematically an engine 1 driving a generator 2 which supplies current to a load 3. The engine is controlled by a control circuit 4 so as to run at a selected operating speed when there is load on the generator and at idling speed when there is no load.

According to the service for which it is intended, the generator 2 may be a direct current generator, an alternating current generator or a generator supplying both direct current and alternating current. The generator is selected to provide the desired voltage and, in the case of alternating current, the desired frequency. Moreover, the alternating current may be either single phase or multiphase, for example three phase. When direct current is desired, the generator is usually of a type having a stationary field and a rotating armature provided with a suitable commutator. For alternating current, the generator may have either a rotating or stationary field. Alternating current produced by the generator may, if desired, be rectified to provide direct current. When both alternating and direct current are desired, the generator may comprise two units, one for producing direct current and the other for producing alternating current. Alternatively a generator with a stationary field may have an armature comprising a direct current winding which delivers direct current through a suitable commutator and an alternating current winding which delivers alternating current through suitable slip rings.

The load 3 may comprise a variety of devices requiring electric power. For example, the load may comprise electric lights, electric tools and various electric appliances. The various load components are provided with suitable switches or disconnecting devices so that the several load components can be turned on and off individually or collectively. The amount of load on the generator can be varied according to the number of load components that are turned on. If all of the load components are turned off, there is no load on the generator.

The engine 1 is an internal combustion engine provided with suitable fuel regulating means for controlling the speed of the engine. The fuel regulating means may, for example, comprise a fuel injection system or a carburetor provided with a suitable throttle valve. The engine is suitably coupled with the generator, for example through gears or a drive chain or belting but is preferably direct connected.

The control circuit 4, as will be described more fully below, comprises means for controlling the carburetor or other fuel regulating means of the engine so that the engine runs at a selected operating speed when there is load on the generator regardless of the amount of load and runs at idling speed when there is no load on the generator.

A suitable carburetor 5 for supplying a controlled fuel-air mixture to the engine is shown by way of example in FIGS. 2 and 3. The carburetor 5 is shown as having an air intake 6 provided with a suitable choke valve 7 controlled by a lever 8, a fuel chamber 9 and a Venturi 10 provided with a throttle valve 11. The carburetor delivers a controlled fuel-air mixture to the engine through an induction pipe 12 connected to the engine intake. The fuel air mixture is controlled by adjustment 13 at normal operating speeds and by an adjustment valve 14 at idling speed.

The throttle valve 11 is shown as a butterfly valve carried by a rotatable shaft 16 which extends diametrically of the throat 10 and projects at opposite sides of the throat. An arm 17 on one end of the throttle valve shaft 16 is connected by suitable linkage 18 to a governor 20. The governor is of any suitable type which is responsive directly or indirectly to the speed of the engine and hence to the speed of the generator. For example, it can be a centrifugal type governor driven by the engine or a pressure type governor comprising a pump or impeller driven by the engine and producing a fluid pressure proportional to engine speed. Alternatively the governor can be responsive to the voltage of frequency of the generator since the voltage and frequency vary with generator speed and hence with engine speed. The governor acts on the throttle valve 11 through the linkage 18 so as to maintain engine speed relatively constant at a selected operating speed at which the generator produces the desired voltage and, in the case of an alternating current generator, the desired frequency. Upon increase of load, the throttle is moved toward a more widely open position while upon decrease of load it is moved toward closed position. The linkage 18 preferably comprises a spring or other resilient linkage component so that the idling control, which will be described below, can override the control of the throttle valve 11 by the governor 20 when there is no load on the generator 2.

On the other end of the throttle valve shaft 16 there is mounted an arm 21 carrying the armature 22 of an iron core electromagnet 23. The electromagnet is provided with leads 24 connecting it in the control circuit which will be described below. When the electromagnet is energized, the armature 22 is attracted to a position as shown in solid lines in FIG. 2 in which it engages the core of the magnet. In this position, the throttle valve 11 is held in a position as illustrated in FIG. 3 in which it almost closes the throat 10 so that only sufficient fuel is supplied to the engine to operate it at idling speed. The electromagnet 23 is wound so that even with a low voltage applied to the electromagnet it will exert sufficient force on the armature 22 to overcome the control exercised by the governor 20 and hold the throttle valve in position for operation of the engine at idling speed. When load on the generator is turned off, the throttle is moved toward closed positions by the governor so that the armature 22 is brought closer to the electromagnet 23 and can hence be more easily attracted to it upon energization of the electromagnet. Moreover at the instant load is turned off, the generator is still running at operating speed to supply full voltage. When load is again turned on and the electromagnet 23 is thereby deenergized, the governor resumes control of the throttle valve and moves it in an opening direction to cause the engine to accelerate to and remain at normal operating speed. The electromagnet 23 is shown mounted by means of a threaded rod 25 and nuts 26 on a bracket 27 fixed to the carburetor so as to be adjustable in an axial direction, thereby adjusting the position in which the throttle 11 is held when the electromagnet is energized. This position determines the idling speed of the engine.

By means of the control circuit 4, the electromagnet 23 is energized when there is no load on the generator 2 and is deenergized when there is a load on the generator. A control circuit in accordance with the present invention is shown by way of example in FIG. 4 where the generator 2 is represented as a direct current generator supplying power to a generator load 3 which, as indicated above, is variable and intermittent. One terminal of the electromagnet 23 is connected to one of the output terminals of the generator 2, shown by way of example as the positive terminal, while the other terminal of the electromagnet 23 is connected through a resistance 30 with the opposite output terminal of the generator. It will thus be seen that the electromagnet 23 and the resistor 30 are connected in series with one another across the output of the generator. A diode 31 is connected in series with the generator load 3 across the output terminals of the generator so that all of the load current flows through the diode. The diode 31 represents a nonlinear resistance providing an approximately constant voltage drop across the diode whenever current is flowing through the diode regardless of the amount of current. For example, the diode may be a germanium diode or a silicon diode having a voltage drop of about 1.2 or 1.3 volts.

The diode 31 is connected in the base-emitter circuit of a transistor 32 the emitter and collector of which are connected to opposite terminals of the electromagnet 23 so that the electromagnet is short circuited by the transistor when the transistor is conducting. With a PNP transistor as shown in FIG. 4, the base is connected to the negative side of the diode 31 while the emitter is connected to the positive side. The transistor is thereby rendered conducting when there is a current flowing through the diode 31 and hence a voltage drop across it and is nonconducting when there is no current flowing through the diode 31. A resistance 33 connected in series between the diode and the base of the transistor and a resistance 34 and capacitor 35 connected in parallel with one another and with the diode form a current limiting and filtering circuit which limits the voltage and voltage peaks applied to the transistor 32.

When there is any load on the generator and hence current through the diode 31, the resulting voltage drop across the diode applied to the base-emitter circuit of the transistor 32 causes the transistor to be conducting thereby effectively short-circuiting the electromagnet 23 and thus deenergizing it. Control of the engine throttle 11 is thereby left to the governor 20 which controls the throttle opening in accordance with engine speed so as to maintain the engine at a selected operating speed. The characteristics of the diode 31 are selected so that the voltage drop across the diode is approximately the same regardless of the amount of load current. With the electromagnet 23 short-circuited by the transistor 32, full generator voltage is applied to the resistor 30, the resistance value of which is appropriately selected so as to avoid excessive current through the transistor or excessive power loss.

When all of the generator load is turned off so that there is no load on the generator, no current flows through the diode 31 and hence there is no voltage drop across it. The transistor 32 hence becomes nonconducting so that current flows through the electromagnet 23 to energize it. Upon energization of the electromagnet 23, the armature 22 is attracted to the solid line position as shown in FIG. 2 so as to override the governor 20 and move the throttle 11 to a position for supplying only enough fuel to the engine to operate it at a selected idling speed. The override of the governor control is permitted either by inherent "resilience" in the governor itself or resilience in the connecting linkage 18 which connects the governor with the throttle valve shaft 16. The throttle valve will be held in idling position as long as there is no load on the generator.

If any load on the generator is turned on, current again flows through the diode 31 whereupon the voltage drop across the diode causes the transistor 32 to become conductive, thereby short-circuiting the electromagnet 23 and hence deenergizing it. Control of the throttle valve 11 is thereupon resumed by the governor 20 to accelerate the engine to operating speed and maintain it at such speed as long as there is load on the generator.

Figure 5:
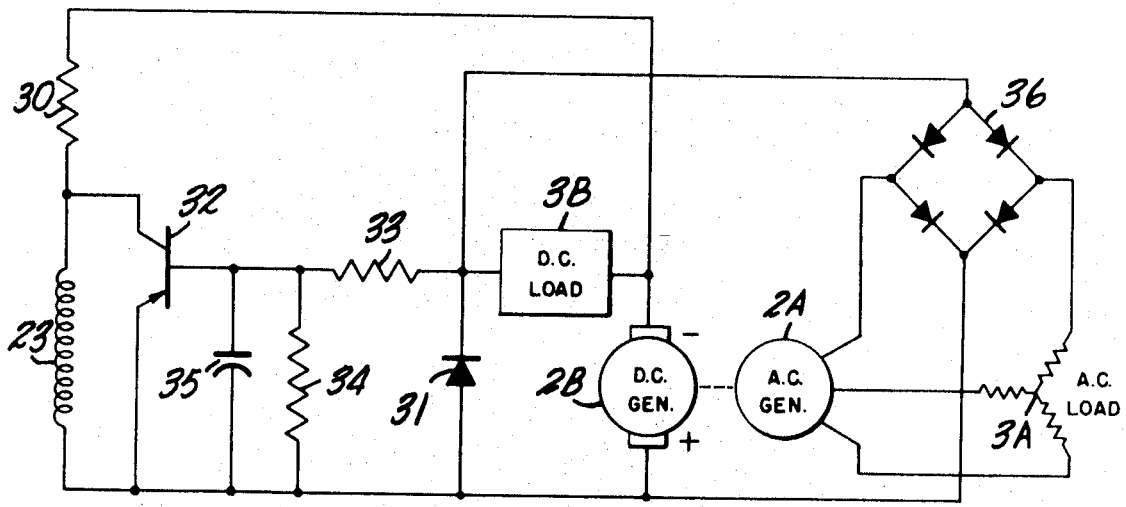
FIG. 5 is a circuit diagram of the control circuit for an override device used with a generator producing both direct and alternating current.

In FIG. 5 there is shown a control circuit which is similar to that of FIG. 4 except that the generator comprises an alternating current winding 2A supplying power to an alternating current load 3A and a direct current winding 2B supplying power to a direct current load 3B. The generator is, for example, of the kind having a stationary field and a rotating armature with a direct current winding delivering power to the direct current output of the generator through a suitable commutator and an alternating current winding delivering power to the alternating current output of the generator through suitable slip rings. The alternating current winding may provide either single phase or multiphase—for example three phase—alternating current of any desired frequency, for example a frequency of 180 cycles per second. A three phase generator winding and corresponding three phase load are shown by way of example in FIG. 5.

The control circuit shown in FIG. 5 comprises the same components as that of FIG. 4 connected in the same manner with respect to the DC generator and DC load. The circuit components are designated by the same reference numerals as in FIG. 4. In addition, the circuit of FIG. 5 comprises a full wave rectifier 36, the alternating current terminals of which are connected between the alternating current generator 2A and alternating current load 3A in series with one phase of the load. The other two phases of the load are connected directly with the respective output terminals of the alternating current generator 2A. The direct current terminals of the rectifier 36 are connected across the diode 31 with the same polarity as the direct current generator 2B.

With respect to the direct current generator and director current load, the control circuit of FIG. 5 operates in the same manner as has been described with respect to the circuit of FIG. 4. Hence, when there is any direct current load on the generator, the resulting current through the diode 31 results in a voltage drop which biases the transistor 32 to a conducting state thereby short-circuiting the electromagnet 23 and leaving control of the engine to the constant speed governor 20. Moreover, if there is any alternating current load on the alternating current generator 2A, the resulting current rectified by the full wave rectifier 36 likewise flows through the diode 31 so as to cause the transistor 32 to be conducting. The electromagnet 23 is thus deenergized at all times when there is either a direct current or an alternating current load on the generator. At any time when there is no load on the generator, either direct or alternating current, the transistor 32 becomes nonconducting as explained above so that the electromagnet 23 is energized and overrides the governor 20 to control the supply of fuel to the engine to operate it at idling speed.

It will be seen that the control provided in accordance with the present invention is fully automatic so that the engine and hence the generator are operated at selected operating speed under control of the governor whenever there is any load on the generator and are operated at idling speed whenever the generator is unloaded.

While preferred embodiments of the invention have been illustrated by way of example in the drawings, it will be understood that many modifications may be made and that the invention is in no way limited to the illustrated embodiments.

We claim:

1. In combination with an electrical generator having an output, a load circuit connected with said generator output, said load circuit including a variable and intermittent load, and an internal combustion engine driving said generator, speed sensitive means for automatically controlling the speed of said engine comprising fuel regulating means controlling the supply of fuel to said engine and governor means responsive to the speed of said engine and controlling said fuel regulating means to maintain the speed of said engine and generator normally at a selected value, electromagnetically actuated means for overriding said governor means to maintain said fuel regulating means in condition to operate said engine at idling speed, and a control circuit comprising a resistor, means connecting said electromagnetically actuated means and said resistor in series with one another across the output of said generator, switch means connected in shunt with said electromagnetically actuated means and means responsive respectively to load and no-load conditions of said generator to close said switch means to short circuit and thereby deenergize said electromagnetically actuated means when there is load on the generator, whereupon said fuel regulating means is controlled by said governor to maintain said engine at said selected speed when there is load on the generator, and said load responsive means is operative to open said switch means and thereby energize said electromagnetically actuated means to override said governor and hold said fuel regulating means in idling condition when there is no load on the generator.

2. A combination according to claim 1, in which said switch means comprises a transistor, and in which said control circuit comprises a diode connected in series with the generator and said load and having the characteristic of producing a voltage drop across said diode when there is load on said generator, and means connecting said diode in circuit with said transistor to control the conductivity of said transistor according to whether or not there is load current flowing through said diode.

3. A combination according to claim 2, in which said connecting means connects said diode in the base-emitter circuit of said transistor.

4. A combination according to claim 3, in which said connecting means comprises resistance in series between said diode and the base of said transistor, resistance in parallel with said diode and capacitance in parallel with said diode.

5. A combination according to claim 2, in which said generator comprises a direct current winding for supplying current to a direct current load and an alternating current winding for applying current to an alternating current load and in which said diode is connected in series with the direct current load and said control circuit further comprising a rectifier having input terminals connected in series between said alternating current load and output terminals connected across said diode.

6. A combination according to claim 5, in which said alternating current winding and alternating current load are three phase and in which the input terminals of said rectifier are connected in series with one phase thereof.

7. A combination according to claim 1, in which said fuel regulating means comprises a throttle valve on a rotatable shaft, and said overriding means comprises an electromagnet, an armature fixed on said shaft and attracted to said electromagnet when the latter is energized to hold said throttle valve in idling position, means mounting said electromagnet for movement toward and away from said armature to vary the position in which said throttle valve is held when said electromagnet is energized, and means for securing said electromagnet in selected position.

8. In combination with an electrical generator having an output, a load circuit connected with said generator output, said load circuit including a variable and intermittent load, and an internal combustion engine driving said generator, speed sensitive means for automatically controlling the speed of said engine comprising fuel regulating means controlling the supply of fuel to said engine and governor means responsive to the speed of said engine and controlling said fuel regulating means to maintain the speed of the said engine and generator normally at a selected value, electromagnetically actuated means for overriding said governor means to maintain said fuel regulating means in condition to operate said engine at idling speed, and a control circuit comprising means for supplying current to said electromagnetically operated means, a transistor controlling the supply of current to said electromagnetically operated means, a diode connected in series with the generator and said load and having the characteristic of producing a voltage drop across said diode when there is load on said generator and hence current through said diode, and means connecting said diode in circuit with said transistor to control the conductivity of said transistor according to whether or not there is load current flowing through said diode, whereby said fuel regulating means is controlled by said governor to maintain said engine at said selected speed when there is load on the generator, and said load responsive means is operative to energize said electromagnetically actuated means to override said governor and hold said fuel regulating means in idling condition when there is no load on the generator.

9. A combination according to claim 8, in which said fuel regulating means comprising a throttle valve on a rotatable shaft, and said overriding means comprising an electromagnet, an armature fixed on aid shaft and attracted to said electromagnet when the latter is energized to hold said throttle valve in idling position, means mounting said electromagnet for movement toward and away from said armature to vary the idle position in which said throttle valve is held when said electromagnet is energized, and means for securing said electromagnet in selected position.

* * * * *